United States Patent

Will et al.

[11] Patent Number: 6,026,208
[45] Date of Patent: Feb. 15, 2000

[54] LIGHT WAVEGUIDES HAVING AT LEAST TWO COATINGS COMPOSED OF PLASTIC MATERIAL

[75] Inventors: Horst Will; Klaus-Dieter Hutschgau, both of Neustadt; Arnold Pfeuffer; Helmut Nowsch, both of Coburg; Wolfgang Dzyck, Meeder; Dieter Kundis, Lautertal, all of Germany

[73] Assignee: Siemens Aktiengesellschaft, Munich, Germany

[21] Appl. No.: 09/070,254

[22] Filed: Apr. 30, 1998

[30] Foreign Application Priority Data

Apr. 30, 1997 [DE] Germany .............................. 197 18 476

[51] Int. Cl.7 ..................................................... G02B 6/02
[52] U.S. Cl. ............................................. 385/128; 385/122
[58] Field of Search ..................................... 385/128, 122, 385/123, 124, 125, 126, 127

[56] References Cited

U.S. PATENT DOCUMENTS 4,432,607 2/1984 Levy .
4,969,711 11/1990 Rogler et al. .
5,181,268 1/1993 Chien ........................................ 385/128
5,204,928 4/1993 Konda et al. ............................ 385/128
5,387,467 2/1995 Höhner et al. .......................... 428/391
5,684,910 11/1997 Chapin et al. ........................... 385/128

FOREIGN PATENT DOCUMENTS 0 515 438   7/1995   European Pat. Off. .
WO 86/03329 6/1986   WIPO .

OTHER PUBLICATIONS

Derwent Abstract Reference 84371 C/48, May 16, 1979.

*Primary Examiner*—Phan T. H. Palmer
*Attorney, Agent, or Firm*—Hill & Simpson

[57] ABSTRACT

A solid optical lead formed by a light waveguide having at least two coatings composed of plastic material having an outer layer which is applied directly on the inner layer and is constructed as a flame-retardant layer. The outer layer is constructed as a halogen-free material and comprises an additive that will prevent an adhesion between the outer layer and the inner layer and, thus, assures a good strippability of the outer layer from the inner layer.

18 Claims, 1 Drawing Sheet

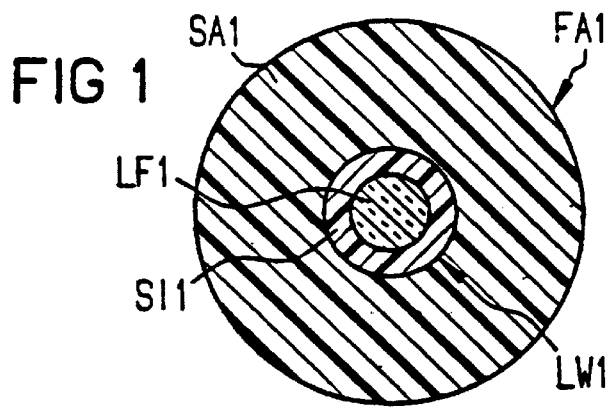
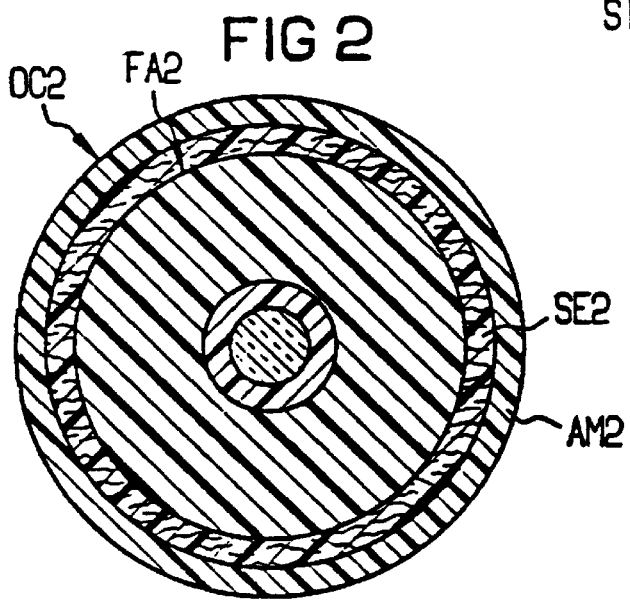
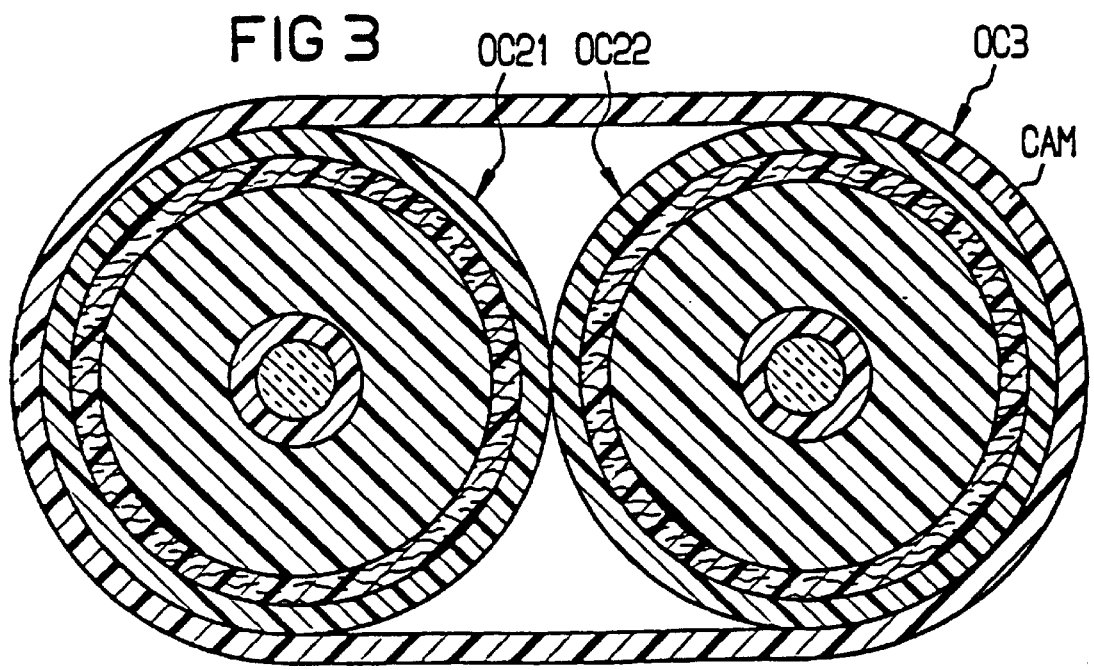

LIGHT WAVEGUIDES HAVING AT LEAST TWO COATINGS COMPOSED OF PLASTIC MATERIAL

BACKGROUND OF THE INVENTION

The present invention is directed to a light waveguide having at least two coatings composed of plastic material, wherein the outer layer for forming a fixed or solid optical lead is applied directly on the inner layer lying therebelow and is constructed to be flame-retardant.

A flame-retardant light waveguide comprising an optical fiber having a primary coating covering the fiber and a secondary coating covering the primary fiber, which is flame-retardant, is disclosed in U.S. Pat. No. 5,204,928, whose disclosure is incorporated herein by reference thereto and which claims priority from the same Japanese Application as European 0 516 438. The outer layer is composed of a polyester elastomer to which ethylene bis-tetrabromophthalimide is added as a flame-retardant agent. Antimony trioxide can also be additionally employed as an auxiliary additive. The outer layer and the inner layer adhere firmly to one another so that the stripping of the outer layer, for example for splicing of a plug-type connection, is not possible or is only possible with great difficulty. Another difficulty is that, due to the employment of the bromine-containing flame-retardant agent, the outer layer is not halogen-free and can, therefore, not be considered as a flame-retardant, non-corrosive layer or an FRNC layer.

For better stripping of the outer protective layer, it is known to separate these from the solid, inner layer lying therebelow with a separate parting layer of, for example, a fluid or pasty material. The application of such an additional parting layer, however, requires an additional working step during the manufacturing process and is also accompanied by the difficulty that the materials employed for this separation layer are likewise not flame-retardant and/or form corrosive constituents when burned.

SUMMARY OF THE INVENTION

The present invention is directed to the object of creating a solid or fixed optical lead or a light waveguide whose outer layer can be easily stripped and that emits no corrosive substances as far as possible. In a solid optical lead or a light waveguide comprising an optical fiber with an inner layer and an outer layer on the inner layer, the improvement is that the outer layer is constructed of a halogen-free material and the outer layer has an additive added to it which will prevent an adhesion between the outer layer and the inner layer which lies therebelow and, therefore, provides a good strippability of the outer layer from the inner layer.

Since the additive is added to the outer layer, it can be applied onto the inner layer together therewith, and an additional work step is thus not needed during the manufacture of the light waveguide in order to achieve the good strippability.

The outer layer advantageously contains between 0.1 and 10 weight % of the additive. Given employment of paraffin as a parting additive, it is preferably between 0.1 and 5 weight % added to the outer layer. When a silicone compound is utilized as the additive, then between 0.5 and 10 weight % of the silicone should be expediently employed.

Other advantages and features of the invention will be readily apparent from the following description of the preferred embodiments, the drawings and claims.

BRIEF DESCRIPTION OF THE DRAWINGS

FIG. 1 is a cross-sectional view of a light waveguide or solid optical lead according to the present invention;

FIG. 2 is a cross-sectional view of an optical cable with a light waveguide or optical lead according to the present invention; and FIG. 3 is a cross-sectional view of a ribbon cable with light waveguides or optical leads according to the present invention.

DESCRIPTION OF THE PREFERRED EMBODIMENTS

The principles of the present invention are particularly useful when incorporated in a fixed or solid optical lead, generally indicated at FA1 in FIG. 1.

The lead FA1 is composed of an optical fiber LF1 which is generally constructed of glass containing a core and cladding material. In the manufacturing process of this optical fiber LF1, a single-layer or multi-layer plastic protective coating SI1 can be applied immediately after the drawing process. The single-layer coating or primary coating is generally composed of an ultraviolet-curable acrylic resin and is hereinafter referred to as the "inner layer". When a second coating layer or secondary coating is applied on the outside of the primary coating, then it is usually composed of a thermoplastic material, for example a polytetrafluoroethylene or PTFE, which is sold under the trademark "TEFLON". The coating, whether it is a single coating or a combination of a primary coating and a secondary coating, forms an inner layer for the light waveguide LW1, which includes the optical fiber LF1 with the protective coating SI1.

The outside diameter of the light waveguide LW1 formed in this way generally lies in the order of magnitude of about 250 $\mu$m. In many instances, the light waveguides LW1 obtained from the fiber manufacture are provided at the outside with an outer layer SA1 which is tightly and firmly seated on the inner layer SI1, and this outer layer SA1 is likewise composed of a plastic material so that what is referred to as a fixed or solid optical lead FA1 occurs. The outer layer SA1 is preferably applied with an extrusion process. In this way, the outside diameter of the fixed or solid optical lead FA1 is obtained on the order of magnitude between 700 $\mu$m and 1200 $\mu$m, and is preferably around 900 $\mu$m. The outside diameter of the fixed or solid optical lead FA1 formed in this way is, thus, significantly greater than the outside diameter of the light waveguide LW1, and the outer layer SA1 generally accounts for far more material than all of the material of the coated light waveguide LW1.

When the outer layer SA1 is firmly applied on the inner layer SI1, for example from an extrusion process implemented at elevated temperatures, then it is generally the case that a certain bond occurs between the usually thermoplastic outside surface of the inner layer SI1 of the light waveguide LW1 and the outside layer SA1, which is preferably is also a thermoplastic material. This causes the strippability, for example the possibility of removing the outer layer SA1, for example in the region of a splice or at plugs, to be made more difficult. The outer layer SA1 that is seated too firmly makes the customization of the fixed or solid optical lead FA1 more difficult. This can lead to increases in the attenuation due to the high mechanical stresses placed on the light waveguides LW1 or the possible stripping lengths must be kept extremely short because of excessively high stresses on the optical fiber LF1 would otherwise occur during the stripping operation. Firmly seated protective sheaths SA1 can also lead to micro-bends, which can cause an increase in the attenuation of the optical fiber LF1.

When the outer layer SA1 is composed of a flame-retardant and halogen-free plastic material, then the illustrated fixed or solid optical lead FA1 is flame-retardant and non-corrosive and is, thus, considered as an FRNC lead. This is particularly true when the inside layer SI1 also contains no halogen because the entire fixed or solid lead FA1 is then composed of non-corrosive material in case of fire; for example, it is constructed to be halogen-free. If halogens are nonetheless present on the inside layer or layers SI1, their influence is relatively slight because the amount of the coating SI1 is slight compared to the amount of material that is applied with the outer protective sheath SA1, for example an FRNC-polyethylene coating.

In the inventively constructed fixed or solid optical lead FA1, the outer protective sheath SA1 is firmly seated on the inner protective sheath SI1, whereby an additive is added to the material that is selected so that the additive prevents the adhesion between the outer layer SA1 and the inner layer SI1 to an optimally far-reaching extent. This means that the outer layer SA1 does not join firmly with the inner layer SI1 and, rather, the two layers remain largely mechanically independent of one another. A simple stripping given adequately great stripping lengths of, preferably, more than 500 mm and up to 1000 mm is possible in a stripping step for the outer protective sheath SA1. Such great stripping lengths are particularly required when customizing sellable products or by a customer or, respectively, at the customer's request.

The outer layer SA1 is constructed only of halogen-free material or materials so that no corrosive constituents are formed in case of fire. A flame-resistant or flame-retardant, non-corrosive fixed or solid optical lead FA1 is created in this way and, in addition, can be easily installed or, respectively, customized, so that it is largely free of microbends and also exhibits no increase in attenuation during a stripping event, namely not even given especially low temperatures.

By applying incompatible material for the inner coating protective sheath SI1, on the one hand, and given the outer protective sheath SA1, on the other hand, a surface activity is created that will cause a parting effect between the light waveguide LW1 provided with the coating and the outside layer SA1. This "decoupling" between the inner layer SI1 and the outer layer SA1 by one or more corresponding additives in the outer layer SA1 is thus already produced in the application, particularly during the extrusion of the outer protective sheath SA1. The incompatibility of the materials for the inner layer SI1 and the outer layer SA1 that is thus intentionally produced leads to a non-dispersive distribution; for example, individual components do not mix uniformly but form a separated mixture comparable to an emulsion, such as, for example, drops of water in oil. They preferably have a linear alignment in the compound and during the extrusion, the juxtaposed components of the separated mixture align in the extrusion direction so that no surface adhesion is present between the layers SI1 and SA1. Over the course of time, a migration of one of the components to the surface generally will occur. The time required for this is mainly dependent on the composition of the mixture, for example, the migration proceeds all the faster the higher the part effecting the separation is made. Moreover, a parting surface activity can likewise be achieved by displacements effects, particularly given elastomers and/or waxes. The quality picture of the surface is determined by the displaced or migrated material component.

Suitable materials that yield the desired parting effect can be dosed or, respectively, compounded as additives to the mixtures of the actual flame-retardant, non-corrosive compound for the outer protective sheath SA1, namely, dependent on the respective formula of the compound. The chemical-physical properties, as well as the characteristics of the light waveguide LW1 (particularly the attenuation and temperature response thereof) are thereby not negatively influenced.

The following plastic materials are preferably employed for the flame-retardant, non-corrosive compound of the outer protective sheath SA1: EPM (ethylene-propylene copolymer) and/or EVA (ethylene-vinyl acetate) and/or PMMA (polymethylmethacrylate)/BA (butylacrylate) and/or PE (polyethylene), particularly high-density polyethylenes (HDPE). High-density polyethylenes and polyethylenes are expediently utilized only in extremely small amounts.

At least one flame-retardant agent, such as, for example, magnesium hydroxide and/or aluminum hydroxide is mixed into the mixture of the materials for the outer layer SA1, namely in quantities that are to be selected dependent on the required degree of flame retardancy, for example VDE, IEC, etc.

The desired parting effect between the inner layer SI1 and the outer layer SA1 is, in particular, achieved by additives in the form of silicone or silicone compounds selected from a group of siloxane and polysiloxane and/or paraffin. Eight preferred mixtures for the manufacture of the outside layer SA1 are recited below, wherein the remainder of the 100 weight % is respectively formed by one or more flame-retardant agents, for example aluminum hydroxide:

A: EPM (1 weight % through 10 weight %) Polysiloxane (0.5 weight % through 10 weight %);
  B: EPM (1 weight % through 20 weight %) HDPE (5 weight % through 10 weight %) Polysiloxane (1 weight % through 10 weight %);
  C: EVA (10 weight % through 40 weight %) Polysiloxane (1 weight % through 10 weight %);
  D: EVA (10 weight % through 40 weight %) Paraffin (0.1 weight % through 5 weight %);
  E: EVA (10 weight % through 30 weight %) EPM (5 weight % through 10 weight %) Paraffin (0.1 weight % through 5 weight %);
  F: EVA (10 weight % through 40 weight %) HDPE (5 weight % through 10 weight %) EPM (5 weight % through 10 weight %) Paraffin (0.1 weight % through 5 weight %) Polysiloxane (0.5 weight % through 10 weight %);
  G: EVA (10 weight % through 40 weight %) HDPE (5 weight % through 10 weight %) PMMA (1 weight % through 20 weight %) Polysiloxane (1 weight % through 10 weight %); and
  H: EVA (10 weight % through 40 weight %) HDPE (5 weight % through 10 weight %) BA (1 weight % through 10 weight %) Polysiloxane (1 weight % through 10 weight %).

The main constituents, like EPM, EVA, PMMA and BA, are preferably introduced as copolymers, whereby a variety of these can also be utilized mixed for forming the compound of the outer layer SA1.

In general, the flame-retardant, non-corrosive compound for the outer layer SA1 expediently contains:

a) at least one component having an elastomer characteristic, for example EPM, EVA, PMMA or BA;
  b) at least one parting agent, for example components with wax characteristics, for example paraffin, or silicone characteristics, for example polysilicone, a fatty acid ester-like calcium stearate, a zinc stearate, a stearic acid and the like;

c) a flame-retardant embodiment, for example at least one flame-retardant agent; and d) potentially at least one component having a thermoplastic characteristic, for example high-density polyethylene.

The above-recited combination possibilities are already flame-retardant in and of themselves and, due to their complete or, respectively, far-reaching freedom from halogen, for example zero halogen, can be utilized as excellent flame-retardant, non-corrosive mixtures that meet all international corrosivity tests and also exhibit the required flame-retardancy.

The flame-repellant nature is tested according to DIN VDE 0472, Part 804 or, respectively, internationally according to IEC 332. According to DIN VDE 0472, Part 804, a 0.6 m long cable specimen is vertically secured to a wall and is heated for 60 seconds in the lower third with a gas flame as an ignition source; this is testing mode B. In testing mode C, a cable bundle is tested, whereby a plurality of cable specimens in tight proximity over a 3.6 m long, vertically attached conductor are subjected for 20 minutes to a pipe burner as a high-energy ignition source. The cable is considered flame-repellant when, during the influence or, respectively, after the removal of the ignition force, the flames go out by themselves before the upper cable end was respectively reached.

Cables with claddings of PVC are, in fact, flame-retardant but are not considered non-corrosive. For example, cables with claddings of polyethylene are highly inflammable and, therefore, not flame-retardant, but are definitely non-corrosive.

The corrosivity is tested according to DIN VDE 0472, Part 813, wherein the corrosive effect is indirectly determined by measuring the electrical conductivity and the pH value of conflagration gases. When the weighted pH value is below 4 and the weighted electrical conductivity is less than 100 mS-m, then the cables are considered non-corrosive. It can occur in specific instances that a halogen-free material will exceed these limit values and the halogen content of the material employed must then be directly measured with an arbitrational method according to DIN VDE 0472, Part 815, whereby 0.2% chlorine equivalent or 0.1% fluorine are indicated as an upper limit value. When these conditions are adhered to, the materials are respectively referred to as non-corrosive and/or zero halogen, as well.

An optical cable OC2 is generally indicated in FIG. 2. The optical cable OC2 includes a fixed or solid optical lead FA2, such as illustrated in FIG. 1, which is preferably provided with a dielectric ply SE2 of tensile elements, for example aramid yarn. The cable OC2 has an outside cladding AM2 that is preferably formed of a flame-retardant, non-corrosive material.

A cable, generally indicated at OC3 in FIG. 3, is composed of two cables OC21 and OC22 which have the structure of the cable OC2 of FIG. 2. These two cables OC21 and OC22 are held together by a common protective cladding CAM, which is also advantageously constructed of flame-retardant, non-corrosive material. The invention can also be utilized in all other standard cable designs, for example with higher numbers of leads as well. It is also possible to construct the cable merely in that a plurality of fixed or solid optical leads analogous to FA1 in FIG. 1 are arranged in a common flame-retardant, non-corrosive outer cladding.

Although various minor modifications may be suggested by those versed in the art, it should be understood that we wish to embody within the scope of the patent granted hereon all such modifications as reasonably and properly come within the scope of our contribution to the art.

We claim:

1. A solid optical lead comprising a light waveguide having at least one inner layer of plastic material and an outer layer of plastic material applied directly on the inner layer, said outer layer being a flame-retardant layer constructed of a halogen-free material and the outer layer having an additive to the material of the outer layer to prevent an adhesion between the inner layer and the outer layer and to provide a good strippability of the outer layer from the inner layer, said additive being a halogen-free material.

2. A solid optical lead according to claim 1, wherein the outer layer contains between 0.1 and 10 weight % of the additive.

3. A solid optical lead according to claim 2, wherein the outer layer contains between 0.1 and 5 weight % paraffin as the additive.

4. A solid optical lead according to claim 3, wherein the outer layer contains between 0.5 and 10 weight % of a silicone compound as part of the additive.

5. A solid optical lead according to claim 2, wherein the additive is between 0.5 and 10 weight percent of a silicone compound.

6. A solid optical lead according to claim 1, wherein the additive is a silicone additive.

7. A solid optical lead according to claim 6, wherein the silicone additive is selected from a group consisting of siloxane and polysiloxane.

8. A solid optical lead according to claim 1, wherein the outer layer contains a polyethylene.

9. A solid optical lead according to claim 8, wherein the polyethylene is a high-density polyethylene.

10. A solid optical lead according to claim 1, wherein the outer layer contains a polymethylmethacrylate.

11. A solid optical lead according to claim 1, wherein the material of the outer layer contains a mixture of polymethylmethacrylate and butylacrylate.

12. A solid optical lead according to claim 1, wherein the outer layer contains a butylacrylate.

13. A solid optical lead according to claim 1, wherein the outer layer contains an ethylene-vinyl acetate.

14. A solid optical lead according to claim 1, wherein the additive is a paraffin.

15. A solid optical lead according to claim 1, wherein the additive is a fatty acid ester.

16. A solid optical lead according to claim 1, wherein the outer layer contains ethylene-propylene copolymer.

17. A solid optical lead comprising a light waveguide having at least one inner layer of plastic material and an outer layer of plastic material applied directly on the inner layer, said outer layer being a flame-retardant layer constructed of a halogen-free material and the halogen-free material of the outer layer having a halogen-free additive mixed therein to prevent an adhesion between the inner layer and the outer layer and to provide a good strippability of the outer layer from the inner layer.

18. A solid optical lead according to claim 17, wherein the additive is selected from a group consisting of a fatty ester acid, silicone and paraffin.

* * * * *